Patented Oct. 27, 1953

2,657,114

UNITED STATES PATENT OFFICE 2,657,114

CHLOROSILANES

George H. Wagner, Kenmore, N. Y., assignor to Union Carbide and Carbon Corporation, a corporation of New York No Drawing. Application June 21, 1949,
Serial No. 100,529

14 Claims. (Cl. 23—14)

It is well known that chlorine-containing silicon compounds can be formed by subjecting silicon at an elevated temperature to the action of chlorine or chlorine compounds, for example, alkyl chlorides or hydrogen chloride. A number of metals are known to catalyze such reactions to some extent, for example, nickel, tin, silver, copper, antimony, manganese and titanium. Compositions containing silicon and a catalytic metal have been prepared in many ways and proportions, as by alloying or by mixing the powdered materials. Copper and other catalytic metals have been deposited on silicon by the reaction $$4MCl + Si = SiCl_4 + 4M$$

where M is the catalytic metal. The resulting compositions have been subjected to various conditioning treatments, such as grinding, sintering, etc.

No catalyst-containing mix has been found which is entirely satisfactory for all such reactions involving silicon and chlorine. On the contrary, the compositions, frequently called "masses," are more or less specific in action, one which is preferable under one set of conditions being inferior under other conditions. Moreover, the behavior of the silicon-catalyst combination does not depend merely on chemical constitution as shown by analysis but on factors such as physical condition, traces of adsorbed gases and the like, most of which are not well understood.

The present invention relates to a catalytic mass for use in the preparation of chlorosilanes and to the preparation of chlorosilanes by the action of hydrogen chloride or alkyl chlorides on silicon. One object of the invention is to improve the efficiency of such processes. A more specific object is to provide a process of this kind giving a substantial yield of dichlorosilanes which are particularly useful in synthesizing organo-silicon compounds.

Copper has long been recognized as a catalyst for preparing $SiHCl_3$ and $SiCl_4$. However, it appears from the reports in the literature that such copper-catalyzed masses as have been used in this connection give low yields of dichlorosilane, or no detectable quantity.

I have discovered that a superior mass for the preparation of the chlorosilanes can be made by plating copper onto particles of silicon from a hydrogen fluoride bath of a copper salt. A greatly improved reaction mixture can be obtained by holding the mass of copper plated silicon for a time at an elevated temperature. The following example is illustrative:

Silicon was ground to between 60 and 80 mesh fineness. A slurry of the ground silicon in water was prepared. A water solution of copper sulfate and hydrogen fluoride in a molecular ratio of about one part copper sulfate to two parts hydrogen fluoride was added to the slurry. The silicon particles were coated uniformly with copper which comprised approximately 6% by weight of the copper-silicon mass. The mass of copper coated silicon was then heated for about fifteen hours at a temperature of from 950° to 1000° C. The heat treated mass was cooled and a mixture of hydrogen and hydrogen chloride in a molecular ratio of about 4:1 was passed over the mass at the rate of 2.5 cubic feet per hour while the temperature was held at 350° C. The volatile silicon containing products were condensed and separated by fractional distillation. Dichlorosilane, $SiH_2Cl_2$, constituted slightly more than 30% of the condensate.

Other methods of combining silicon and copper salts in the presence of hydrogen fluoride can be adopted without departing from the scope of this invention. For example silicon can be added directly to a water solution of a copper salt and hydrogen fluoride. The slurry of silicon in water as used in the test described is merely illustrative of the manner in which the plating of copper on silicon in the presence of hydrogen fluoride can be accomplished.

The proportion of copper in masses prepared in accordance with my invention is not critical. Best results are obtained if the weight of copper is not less than 1% nor more than 25% of the weight of the mass.

It will be understood that copper can be plated onto silicon from hydrogen fluoride baths of all water soluble copper salts and this invention is not limited to the use of copper sulfate. Among the salts that have been found satisfactory are copper nitrate, copper acetate, cupric chloride and cuprous chloride. The ratio of hydrogen fluoride to the copper salt does not appear to be critical; however, to obtain an even coating of copper in a reasonable time, a molecular ratio of at least two parts hydrogen fluoride to one part copper salt is preferred.

The plated mass can be heated at different temperatures and for various periods of time, but a treatment for a minimum of three hours at a temperature of at least 900° C. is considered desirable. In general as the temperature is decreased the time of treatment must be increased. The preferred heat treatment is that described in the example above of 15 hours at a temperature of 950° to 1,000° C.

The reaction between the copper-silicon mass and hydrogen chloride produces good yields of dichlorosilanes as well as other chlorosilanes at temperatures ranging from 250° to 450° C. The amount of dichlorosilane in the product averages about 28% at temperatures of 335° to 430° C. and decreases somewhat at lower or higher temperatures.

The presence of hydrogen in the stream of hydrogen chloride which passes over the copper-silicon mass serves to dilute the reactants and aids in controlling the reaction. Argon or other non-oxidizing gases can be substituted for the hydrogen or the diluents can be omitted without departing from the scope of the invention. Satisfactory yields of chlorosilanes have been obtained with hydrogen-to-hydrogen chloride ratios up to 20 to 1.

The mass of the invention can also be employed in the manufacture of the methyl chlorosilanes and homologues thereof. In one test methyl chloride $CH_3Cl$ was passed over a bed of the copper-silicon mass at 400° C. The mass contained about 10% plated copper by weight and had been heat treated for 15 hours at 950–1000° C. The volatile product which was condensed and separated by fractional distillation, contained: 15.6% $CH_3SiCl_3$, 19.1% $CH_3SiHCl_2$, 51.1% $(CH_3)_2SiCl_2$, 7.3% $(CH_3)_3SiCl$, remainded $SiHCl_3$ and $SiCl_4$.

The copper-silicon mass prepared according to this invention has proved itself to be generally efficacious in the production of chlorosilanes and particularly in the production of dichlorosilanes. As shown above, the combination of the mass of the invention with either hydrogen chloride or alkyl chlorides results in high yields of dichlorosilanes. In the appended claims the term RCl will be used to designate the class of materials comprising hydrogen chloride and the alkyl chlorides.

While the foregoing description refers to the use of "silicon" in making the catalyzed masses, it will be understood that this term embraces all silicon-containing compositions and alloys which are sufficiently free from interfering impurities.

This application is in part a continuation of my co-pending application, U. S. Patent 2,499,009 issued February 28, 1950.

I claim:

1. A process for the production of chlorosilanes comprising the steps of mixing particles of silicon with a water solution of hydrogen fluoride and a copper salt to form a mass of copper coated silicon particles, reacting said mass with hydrogen chloride, and recovering a chlorosilane.

2. A process for the production of chlorosilanes comprising the steps of mixing particles of silicon with a water solution of hydrogen fluoride and a copper salt to form a mass of copper coated silicon particles, heating said mass for at least three hours at a temperature of at least 900° C., reacting said mass with hydrogen chloride, and recovering a chlorosilane.

3. A process for the production of chlorosilanes comprising the steps of mixing particles of silicon with a water solution of hydrogen fluoride and a copper salt to form a mass of copper coated silicon particles, heating said mass for at least three hours at a temperature of at least 900° C., reacting said mass with hydrogen chloride at a temperature of 250° to 450° C. and recovering a chlorosilane.

4. A process for the production of chlorosilanes comprising the steps of mixing particles of silicon with a water solution of hydrogen fluoride and a copper salt to form a mass of copper coated silicon particles, heating said mass for at least three hours at a temperature of at least 900° C., reacting said mass with hydrogen chloride in the presence of a non-oxidizing gas at a temperature of 250° to 450° C. and recovering a chlorosilane.

5. A process for the production of chlorosilanes comprising the steps of mixing particles of silicon with a water solution of hydrogen fluoride and a copper salt to form a mass of copper coated silicon particles; reacting said mass with an alkyl chloride and recovering an alkyl chlorosilane.

6. A process for the production of chlorosilanes comprising the steps of mixing particles of silicon with a water solution of hydrogen fluoride and a copper salt to form a mass of copper coated silicon particles, heating said mass for at least three hours at a temperature of at least 900° C., reacting said mass with an alkyl chloride, and recovering an alkyl chlorosilane.

7. A process for the production of chlorosilanes comprising the steps of mixing particles of silicon with a water solution of hydrogen fluoride and a copper salt to form a mass of copper coated silicon particles, heating said mass for at least three hours at a temperature of at least 900° C., reacting said mass with an alkyl chloride at a temperature of 250° to 450° C. and recovering an alkyl chlorosilane.

8. A process for the production of chlorosilanes comprising the steps of mixing particles of silicon with a water solution of hydrogen fluoride and a copper salt to form a mass of copper coated silicon particles; heating said mass for at least three hours at a temperature of at least 900° C., reacting said mass with an alkyl chloride in the presence of a non-oxidizing gas at a temperature of 250° to 450° C. and recovering an alkyl chlorosilane.

9. A process for the production of chlorosilanes comprising the steps of mixing particles of silicon with a water solution of hydrogen fluoride and a copper salt to form a mass of copper-coated silicon particles, reacting said mass with RCl, R representing at least one of the materials in the group consisting of hydrogen and the alkyl radicals, and recovering a chlorosilane.

10. A process for the production of chlorosilanes comprising the steps of mixing particles of silicon with a water solution of hydrogen fluoride and a copper salt to form a mass of copper-coated silicon particles, heating said mass for at least three hours at a temperature of at least 900° C., reacting said mass with RCl, R representing at least one of the materials in the group consisting of hydrogen and the alkyl radicals; and recovering a chlorosilane.

11. A process for the production of chlorosilanes comprising the steps of mixing particles of silicon with a water solution of hydrogen fluoride and a copper salt to form a mass of copper-coated silicon particles, heating said mass for at least three hours at a temperature of at least 900° C., reacting said mass with RCl, R representing at least one of the materials in the group consisting of hydrogen and the alkyl radicals, at a temperature of 250° to 450° C. and recovering a chlorosilane.

12. A process for the production of chlorosilanes comprising the steps of mixing particles of silicon with a water solution of hydrogen fluoride and a copper salt to form a mass of copper-coated silicon particles, heating said mass for at least three hours at a temperature of at least 900° C., reacting said mass with RCl, R representing at least one of the materials in the group consisting of hydrogen and the alkyl radicals, in the presence of a non-oxidizing gas at a temperature of 250° to 450° C. and recovering a chlorosilane.

13. A copper-silicon chemical reactant mass formed by mixing particles of silicon with an aqueous solution of hydrogen fluoride and a copper salt whereby a substantially uniform coating of copper is deposited on said silicon particles.

14. A copper-silicon chemical reactant mass formed by mixing particles of silicon with an aqueous solution of hydrogen fluoride and a copper salt, depositing on said particles of silicon from said solution a substantially uniform coating of copper equal to from 1% to 25% of the weight of said mass and then heating said mass for at least three hours at a temperature of at least 900° C.

GEORGE H. WAGNER.

References Cited in the file of this patent

UNITED STATES PATENTS

| Number | Name | Date |
| --- | --- | --- |
| 2,420,912 | Hurd | May 20, 1947 |
| 2,447,873 | Rochow | Aug. 24, 1948 |
| 2,464,033 | Gilliam | Mar. 8, 1949 |
| 2,466,413 | Gilliam | Apr. 5, 1949 |
| 2,532,430 | Strother et al. | Dec. 5, 1950 |

OTHER REFERENCES

Hurd, Jour. Am. Chem. Soc., vol. 67, July 1945, pages 1057–1059.